United States Patent [19]

Biss

[11] Patent Number: 4,732,398
[45] Date of Patent: Mar. 22, 1988

[54] BELLOWS-TYPE BEARING SEAL AND METHOD OF USE

[76] Inventor: Elmer H. Biss, R.R. 1, Elbow Lake, Minn. 56531

[21] Appl. No.: 741,272

[22] Filed: Jun. 4, 1985

[51] Int. Cl.$^4$ .................. F16J 15/36; F16J 3/04; A01C 5/06
[52] U.S. Cl. .................. 277/212 FB; 277/88; 277/95; 277/200; 111/88; 74/18; 403/50; 384/482; 305/11
[58] Field of Search .................. 111/87, 88; 277/88, 277/95, 200, 212 FB, 1, 81 R; 74/18, 18.1, 18.2; 403/50, 51; 384/481, 482; 305/11

[56] References Cited

U.S. PATENT DOCUMENTS

| | | |
|---|---|---|
| 1,368,253 | 2/1921 | Fulton .................. 74/18.2 X |
| 1,860,305 | 5/1932 | Baseman .................. 111/88 |
| 2,056,197 | 10/1936 | Knebusch .................. 74/18.1 X |
| 2,083,438 | 6/1937 | Dube .................. 277/88 X |
| 2,237,619 | 4/1941 | Williams .................. 74/18.2 X |
| 2,270,519 | 1/1942 | Fisher . |
| 2,356,947 | 8/1944 | Pranger et al. .................. 277/200 X |
| 2,522,231 | 9/1950 | Loftis .................. 277/95 X |
| 2,906,562 | 9/1959 | Burgman .................. 305/11 |
| 2,999,699 | 9/1961 | Lafferty . |
| 3,019,663 | 2/1962 | Breunich .................. 403/50 |
| 3,068,712 | 12/1962 | Kuntzmann .................. 305/11 X |
| 3,192,690 | 7/1965 | Taylor . |
| 3,313,580 | 4/1967 | Jelatis .................. 384/481 |
| 3,428,340 | 2/1969 | Pelton . |
| 3,455,562 | 7/1969 | Burtis . |
| 3,857,572 | 12/1974 | Taylor et al. . |
| 3,909,076 | 9/1975 | Kato .................. 277/95 X |
| 4,002,818 | 1/1977 | Kunze . |
| 4,067,585 | 1/1978 | Rode . |
| 4,214,759 | 7/1980 | Douty et al. . |

FOREIGN PATENT DOCUMENTS

| | | | |
|---|---|---|---|
| 658627 | 4/1938 | Fed. Rep. of Germany .................. 277/95 |
| 2357795 | 2/1978 | France .................. 277/200 |
| 520377 | 4/1940 | United Kingdom .................. 277/95 |
| 864507 | 4/1961 | United Kingdom .................. 277/88 |
| 2043418 | 10/1980 | United Kingdom .................. 111/88 |
| 654206 | 3/1979 | U.S.S.R. .................. 111/88 |

Primary Examiner—Robert S. Ward
Attorney, Agent, or Firm—Fleit, Jacobson, Cohn & Price

[57] ABSTRACT

A rubber dirt-excluding and grease-retaining seal for use in machine assemblies such as furrow forming disc assemblies in grain drills, marker disc assemblies and the like comprises a generally cylindrical, accordian-like body formed of interconnected pocket like rings defined by generally radially extending interconnected walls rendering the body axially compressible and extensible. In use, the seal is compressed between a rotary disk like member on a shaft and a stationary hub like member and is useful in excluding dirt from the disc bearing while retaining grease therein.

2 Claims, 9 Drawing Figures

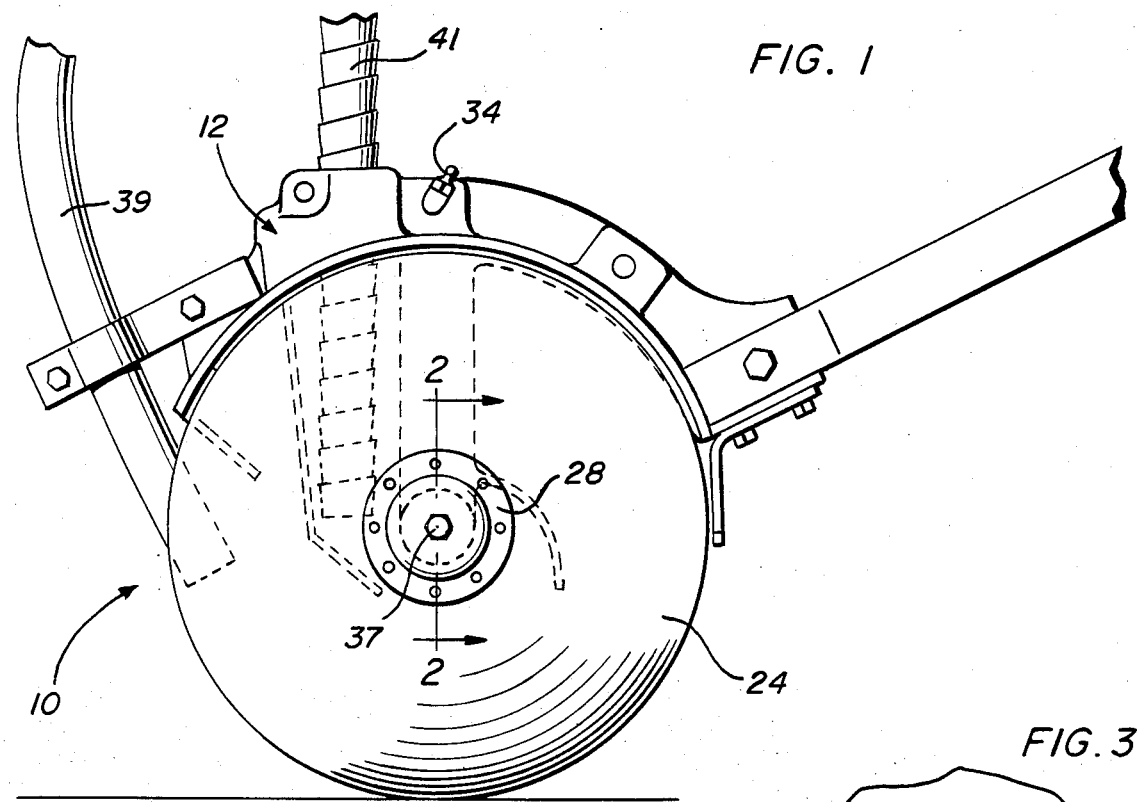
FIG. 1
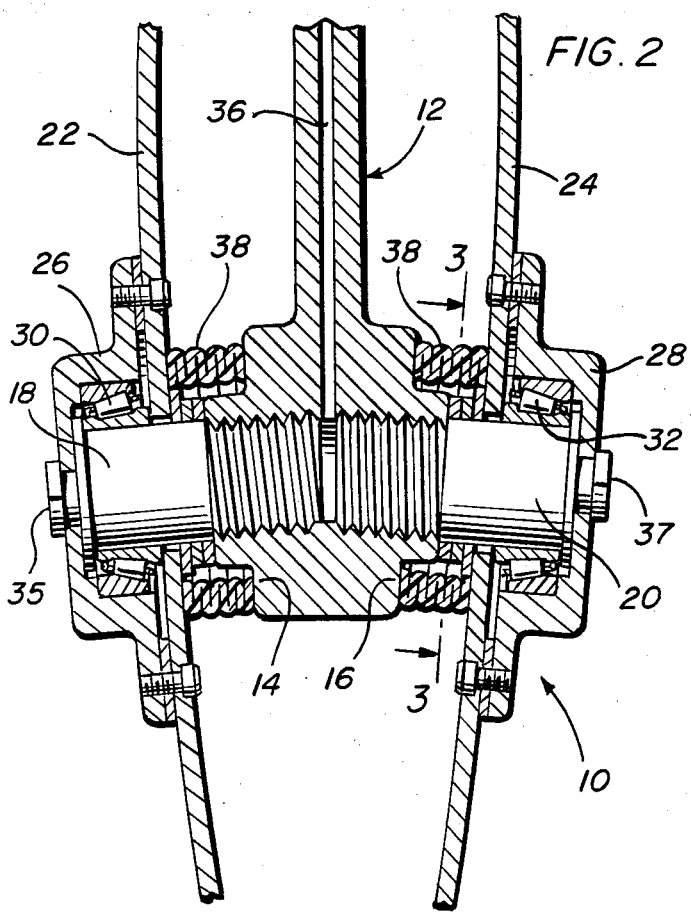
FIG. 2
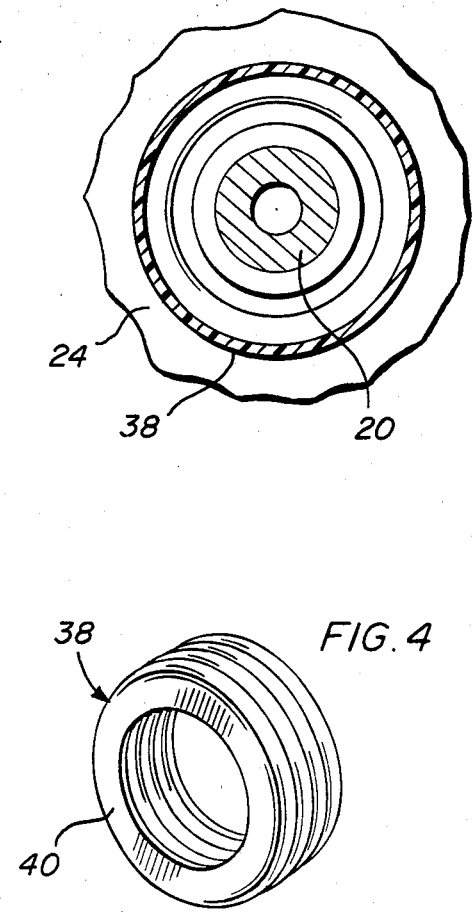
FIG. 3
FIG. 4

BELLOWS-TYPE BEARING SEAL AND METHOD OF USE

FIELD OF THE INVENTION

This invention relates to a seal structure of rubber or synthetic rubber composition which can be used in a variety of applications, in machinery such as agricultural equipment, for preventing dirt from penetrating between moving parts of the machinery and preventing escape of grease therefrom. The invention is particularly useful, for example, for protecting bearings of rotary disc-type equipment such as furrow forming discs or marker discs.

STATEMENT OF PRIOR ART

Applicant is aware of the following U.S. patents, the relevance of which is that they relate to seal structures and the like. None of the patents, however, discloses apparatus having the features of the present invention.

U.S. Pat. No. 2,270,519: H. P. Fisher; 1-20-42.
U.S. Pat. No. 2,999,699: W. M. Lafferty; 9-12-61.
U.S. Pat. No. 3,192,690: D. D. Taylor; 7-6-65.
U.S. Pat. No. 3,428,340: H. L. Pelton; 2-18-69.
U.S. Pat. No. 3,455,562: W. A. Burtis; 7-15-69.
U.S. Pat. No. 3,857,572: Taylor et al.; 12-31-74.
U.S. Pat. No. 4,002,818: Kunze; 1-11-77.
U.S. Pat. No. 4,067,585: Rode; 1-10-78.
U.S. Pat. No. 4,214,759: Douty et al.; 7-29-80.

SUMMARY OF THE INVENTION

A rubber or rubber-like grease and dirt seal structure in accordance with the invention comprises a generally cylindrical element of bellows or accordian-type construction having a plurality of interconnected annular pockets defined by radially extending interconnecting walls, the structure being resiliently extensible and compressible in an axial direction. The diameter, size, number of annular pockets, and hardness of the rubber affecting the axial resilience of the seal may vary dependent on the application.

Seals in accordance with the invention are particularly useful, for example, as grease-retaining and dirt-excluding seals for rotary disc-type agricultural machines in which a disc is rotatably mounted by means of a ball or roller bearing on a spindle, and the seal is compressed between a shoulder on the spindle and a part of the rotary disc, to exclude dirt from the bearing while preventing escape of grease therefrom.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 1 is a side elevational view of a disc assembly of a double-disc furrow opener on a grain drill.

FIG. 2 is an enlarged sectional view on line 2—2 of FIG. 1 showing the use of a pair of rubber seals in accordance with the invention.

FIG. 3 is a sectional view on line 3—3 of FIG. 2.

FIG. 4 is a perspective view of one of the seals.

DESCRIPTION OF PREFERRED EMBODIMENT

Figure 5:
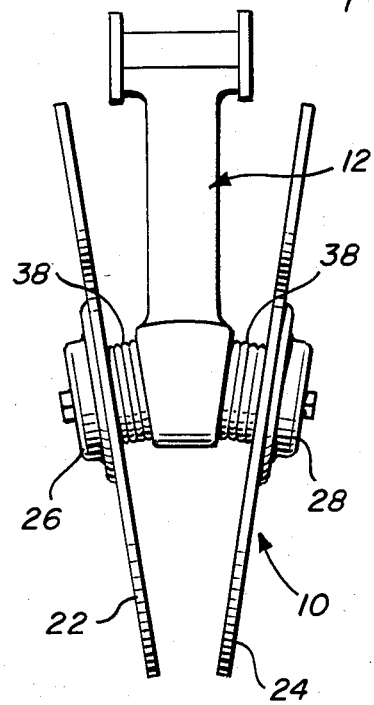
FIG. 5 is a front elevational view of the disc assembly.

Referring initially to FIGS. 1 to 5, there is illustrated a disc assembly 10 for a common type of double-disc furrow opener on a grain drill. Thus, the assembly may comprise a cast hanger 12 providing opposed hubs 14, 16 into which are threaded pair of stub shafts 18, 20 rotatably mounting respective oppositely inclined furrowing discs 22, 24. The discs may be screwed or bolted to cup-like end caps 26, 28 journaled on the respective stub shafts by means of roller bearings 30, 32. The end caps may be retained by bolts 35, 37, for example. The hanger is provided with a grease nipple 34 and conduit 36 for supply of grease to the bearings. FIG. 1 also shows grain and fertilizer or like supply tubes 39, 41 for delivering such materials between the discs in known manner.

The above-described assembly is typical of those commonly used in known grain grills, and commonly such assemblies are provided with disc-type seals (not shown) positioned around the respective hubs 14, 16 and engaging against the inner surfaces of discs 22, 24. It is found, however, that due to the rather flimsy construction of such seals, dirt tends to roll under the seals thereby requiring frequent greasing of the machine and possibly resulting in premature wear of moving parts of the machine. Therefore, in accordance with the invention, the standard form of disc seals are replaced by novel seal members 38, the construction of which is shown in detail in FIGS. 4 and 9.

Figure 9:
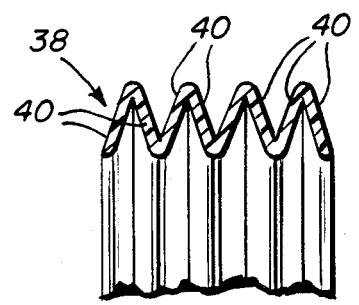
FIG. 9 is a part sectional view of a seal in accordance with the invention opened out axially to show its construction more clearly.

Each seal member 38 comprises a generally accordian-like cylindrical body of rubber or like resilient material molded to provide an axial series of interconnected pocket-like rings defined by adjacent radially extending walls 40. FIG. 9 shows the seal member opened up axially in order to show its construction more clearly. In use, however, as shown in FIG. 2, seals 38 are positioned with a degree of axial compression between the respective hubs 14, 16 and the inner surfaces of discs 22, 24 when the discs are bolted onto the respective stub shafts. In practice, it is found that the pressure applied to the seal members provides a sealing effect which is superior to that of the prior art seals in exclusion of dirt from the bearings and retention of grease, thereby increasing time between grease applications and prolonging the life of the apparatus.

Figure 6:
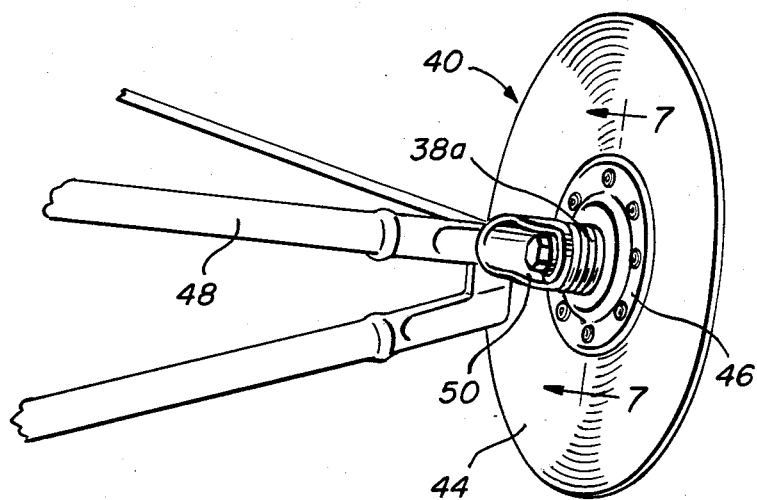
FIG. 6 is a perspective view of a marker disc assembly having a seal in accordance with the invention.
Figure 7:
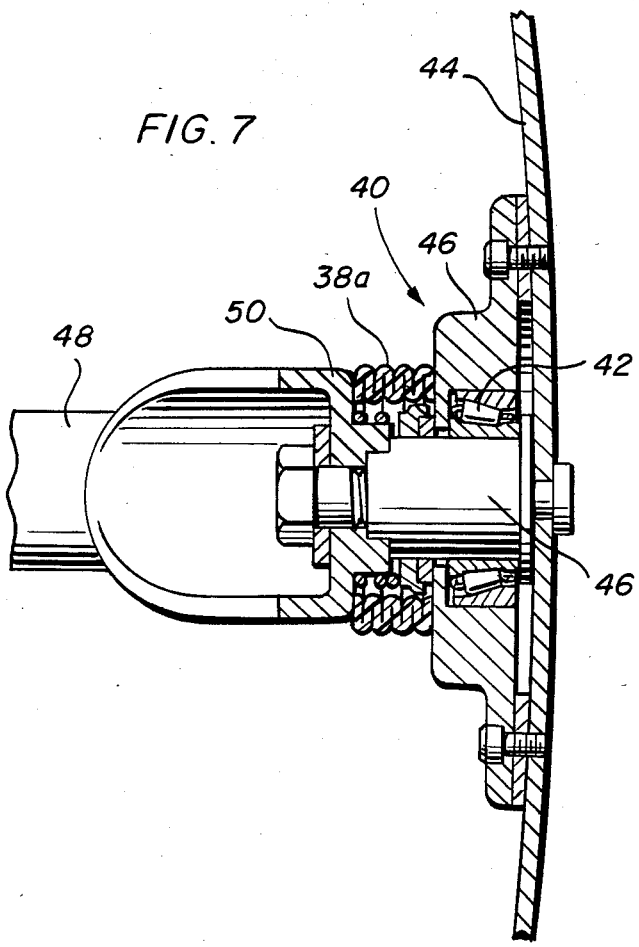
FIG. 7 is an enlarged sectional view on line 7—7 of FIG. 6.

FIGS. 6 and 7 show a like seal member 38a as used in a known form of row marker disc assembly 40 for providing dirt exclusion and grease retention in like manner to the previous embodiment for the disc bearing 42. In the marker disc assembly, disc 44 is attached to a cap 46 journally mounted by bearing 42 on a stub shaft 46 at the end of an arm 48. The arm terminates in a hub-like member 50 carrying the stub shaft, and seal 38a is compressed between member 50 and cap 46 in like manner to the previous embodiment where it is equally effective for dirt exclusion and grease retention.

Figure 8:
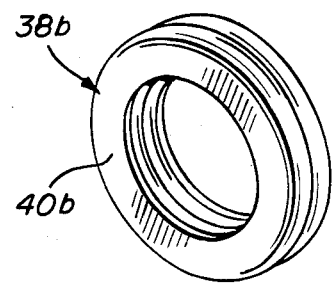
FIG. 8 is a perspective view of an alternative form of seal in accordance with the invention.

FIG. 8 shows a seal member 38b which is similar to members 38 and 38a previously described, except that it has a lesser number of interconnected rings, showing that seals in accordance with the invention can be made in different lengths to suit different applications.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an assembly comprising a rotary disc-like ground engaging element generally supported on a shaft by a bearing means subject to engagement by dirt, the shaft extending from a stationary hub-like means, means for excluding dirt from the bearing means and retaining grease therein comprising a generally cylindrical accordian-like seal member of resilient material, said body having a constant thickness and configuration from end-to-end and formed as a plurality of identical axially interconnected pocket-like rings defined by interconnected generally radially extending and oppositely inclined walls, the seal member embracing the shaft and being axially compressed between the rotary disc-like element and the stationary hub-like means, said cylindrical seal member including inwardly opening V-shaped pockets and outwardly opening V-shaped pockets of substantially the same size to enable equal expansion and contraction throughout the length of the seal, said seal terminating in walls that incline inwardly and longitudinally outwardly into edge portions engaged with the disc-like element and hub-like means.

2. The method of prolonging the expected wear life of a bearing assembly incorporated between a stationary supporting spindle and the hub of a rotatable ground engaging and moving disc-like element which tends to deposit soil, dirt and other wear inducing materials into the bearing means which requires frequent lubrication of the bearing means and results in low wear life expectancy, said method including the step of removing an existing seal of solid resilient construction and replacing the solid seal with an elongated cylindrical body of expandable and compressible resilient material with said body being constructed of a cylindrical sheet of resilient material having a constant thickness from end to end with the resilient body being formed with a plurality of identical inclined walls with adjacent walls being oppositely inclined to provide a plurality of radially inwardly opening V-shaped pockets and a plurality of radially outwardly opening V-shaped pockets to retain the resiliency of the body and enable substantial variation in the length thereof while maintaining a seal between the stationary spindle and the hub of the rotatable disc-like element, said cylindrical body being of unitary construction with the two outermost walls being inclined inwardly toward the shaft and longitudinally outwardly for engagement with opposed radial surfaces extending radially outwardly from the shaft with one of the surfaces being stationary with the shaft and the other of the surfaces being rotatable with the disc-like element.

* * * * *